US012459086B2

(12) United States Patent
Ross

(10) Patent No.: US 12,459,086 B2
(45) Date of Patent: Nov. 4, 2025

(54) RATCHET FLEX JOINT LOCKING MECHANISM

(71) Applicant: Snap-on Incorporated, Kenosha, IL (US)

(72) Inventor: David T. Ross, Kenosha, WI (US)

(73) Assignee: Snap-on Incorporated, Kenosha, IL (US)

(*) Notice: Subject to any disclaimer, the term of this patent is extended or adjusted under 35 U.S.C. 154(b) by 455 days.

(21) Appl. No.: 18/122,287

(22) Filed: Mar. 16, 2023

(65) Prior Publication Data

US 2024/0308036 A1 Sep. 19, 2024

(51) Int. Cl.
*B25B 23/00* (2006.01)
*B25B 13/46* (2006.01)

(52) U.S. Cl.
CPC ........ *B25B 23/0028* (2013.01); *B25B 13/461* (2013.01); *B25B 23/0035* (2013.01)

(58) Field of Classification Search
CPC ..... B25B 13/46; B25B 13/462; B25B 13/463; B25B 13/465; B25B 23/0028; B25G 1/06; B25G 1/063; B25G 1/066; B25G 3/14; B25G 3/16; B25G 3/18
See application file for complete search history.

(56) References Cited

U.S. PATENT DOCUMENTS

| | | | | |
|---|---|---|---|---|
| 4,463,632 | A | 8/1984 | Parke | |
| 5,199,335 | A | 4/1993 | Arnold et al. | |
| 6,167,787 | B1 * | 1/2001 | Jarvis | B25B 23/0021 81/177.8 |
| 6,220,125 | B1 | 4/2001 | Lan | |
| 6,295,898 | B1 | 10/2001 | Hsieh | |

(Continued)

FOREIGN PATENT DOCUMENTS

| | | | |
|---|---|---|---|
| CN | 111246972 | A | 6/2020 |
| DE | 102009050566 | A1 | 4/2011 |

(Continued)

OTHER PUBLICATIONS

UK Intellectual Property Office, Examination Report issued in corresponding Application No. GB2403117.1, dated Sep. 2, 2024, 8 pp.

(Continued)

*Primary Examiner* — David B. Thomas
(74) *Attorney, Agent, or Firm* — Taft Stettinius & Hollister LLP

(57) ABSTRACT

A flex joint headed tool with a locking mechanism adapted to selectively retain the angle of the head relative to a handle. The locking mechanism may retain the head in at least one of two positions using a bias member and two detent balls disposed at opposite ends of the bias member. The bias member and detent balls may be disposed in a through hole disposed in a locking lever, with one detent ball engaging a joint tang and the other detent ball engaging a detent disposed in a tool body or handle, wherein the detent balls provide tactile response to a user. The locking lever may rotate between locked and unlocked positions, whereby in the locked position, the ratchet head is prevented from rotating relative to the handle, and when in the unlocked position, the head may rotate relative to the handle.

14 Claims, 3 Drawing Sheets

(56) References Cited

U.S. PATENT DOCUMENTS

| | | | | |
|---|---|---|---|---|
| 6,324,947 | B2 * | 12/2001 | Jarvis | B25G 1/063 81/177.8 |
| 6,453,779 | B2 * | 9/2002 | Hu | B25B 13/463 81/63 |
| 6,457,389 | B1 * | 10/2002 | Hu | B25B 13/463 81/63 |
| 6,729,209 | B1 | 5/2004 | Chen | |
| 6,752,048 | B1 | 6/2004 | Chiang | |
| 7,000,507 | B1 | 2/2006 | Lin | |
| 7,089,830 | B2 * | 8/2006 | Hu | B25B 13/463 83/61 |
| 7,146,886 | B1 | 12/2006 | Wu | |
| 7,165,480 | B2 | 1/2007 | Lin | |
| 7,168,346 | B2 * | 1/2007 | Lin | B25G 1/063 81/177.8 |
| 7,318,366 | B2 | 1/2008 | Lee et al. | |
| 7,401,538 | B2 | 7/2008 | Cheng | |
| 7,509,893 | B2 | 3/2009 | Wu | |
| 8,245,604 | B2 | 8/2012 | Chen | |
| 9,089,953 | B2 * | 7/2015 | Heidel | B25B 13/463 |
| 10,335,932 | B2 | 7/2019 | Wang | |
| 10,532,448 | B2 | 1/2020 | Huddy | |
| 10,828,751 | B2 * | 11/2020 | Abel | B25B 13/468 |
| 11,298,804 | B2 * | 4/2022 | Hsieh | B25B 13/463 |
| 11,331,776 | B2 | 5/2022 | Su | |
| 11,772,247 | B2 * | 10/2023 | Ross | B25B 13/46 81/60 |
| 2001/0000092 | A1 | 4/2001 | Jarvis | |
| 2011/0017028 | A1 | 1/2011 | Kuo | |
| 2012/0144960 | A1 | 6/2012 | Huang | |
| 2012/0167727 | A1 | 7/2012 | Chen | |
| 2017/0320199 | A1 * | 11/2017 | Frye | B25G 1/066 |
| 2018/0043512 | A1 | 2/2018 | Zhang et al. | |
| 2021/0031336 | A1 | 2/2021 | Anderson | |
| 2021/0114188 | A1 | 4/2021 | Ross | |

FOREIGN PATENT DOCUMENTS

| | | | |
|---|---|---|---|
| EP | 1674203 | A1 | 6/2006 |
| TW | 200936322 | A | 9/2009 |
| TW | M449062 | U | 3/2013 |

OTHER PUBLICATIONS

Taiwan Patent Office, First Office Action issued in corresponding Application No. 113109684, dated Feb. 26, 2025, 14 pp.

UK Intellectual Property Office, Combined Search and Examination Report issued in corresponding Application No. GB2503913.2, dated Mar. 28, 2025, 7 pp.

UK Intellectual Property Office, Examination Report issued in corresponding Application No. GB2403117.1, dated Mar. 28, 2025, 6 pp.

Australian Patent Office, Examination Report No. 1 issued in corresponding Application No. 2024201440, dated May 15, 2025, 6 pp.

* cited by examiner

RATCHET FLEX JOINT LOCKING MECHANISM

TECHNICAL FIELD OF THE INVENTION

The present invention relates generally to a ratchet tool, and more specifically to a ratchet flex joint locking mechanism with improved positive detent action for a ratchet tool.

BACKGROUND OF THE INVENTION

Flex head torque application wrenches, such as, for example, ratchet wrenches or breaker bars, are a popular tool for fastening work pieces in angled or other hard-to-reach places. A flexible, bending head allows the head of the wrench to pivot about a flex joint and to be selectively angled relative to the handle. The user can thus operate the ratchet wrench with a desired angle between the head and handle of the wrench to allow easier access to a work piece.

Existing flex head ratchet wrenches include various forms of flex joints. For example, some existing wrenches incorporate a lock button into the handle of the tool. Other designs are difficult to manufacture or allow dirt to enter and jam the button lock. Some designs include locking mechanisms that have a limited detent action, for example with a spring or bias member. While such mechanisms provide some detent action between the locked and unlocked position, the locking strength is limited due to the force applied by the spring. A larger and/or stiffer spring could be employed to improve the detent action, but space is limited and greater spring force would cause increased wear between the ball and the teeth on the flex joint tang.

SUMMARY OF THE INVENTION

The present invention relates to Applicant's invention disclosed and described in co-pending U.S. patent application Ser. No. 16/554,718, filed Aug. 29, 2019, the entire contents of which are incorporated herein by reference.

The present invention relates broadly to a flex-joint type handled tool, such as, for example, a ratchet wrench or a breaker bar, with a locking mechanism with an improved detent action that detains the selected angle between the head and handle. A locking lever rotatably coupled to a tool head and handle may define a through hole through which a bias member, such as a spring, and two detent balls at opposing ends of the bias member are disposed. One or more detents may be defined or milled in a yoke of the handle providing at least two distinct positions for a locking lever and a tactile response to a user to indicate the selective engagement of one of the distinct positions.

According to an embodiment, a tool, such as, for example, a ratchet wrench or breaker bar, may include a head having a joint tang defining tang teeth and a handle pivotally coupled to the head. The handle may define first and second detents. A locking lever may be rotatably coupled to the handle. The locking lever may include a base defining lever teeth. The locking lever may define a through hole in which a bias member is disposed. A first detent ball may be disposed between a first end of the bias member and the tang teeth, and a second detent ball may be disposed between the bias member and the handle. The second detent ball may selectively engage one of the first and second detents of the handle. The locking lever may be configured to selectively engage the tang teeth with the lever teeth to retain the selected angle between the head and the handle.

According to an embodiment, a tool may include a head comprising tang teeth and a handle defining a yoke with a yoke base. The yoke base may define first and second detents and the head may be pivotally coupled to and disposed within a yoke. A locking lever may be disposed in the yoke between the head and a base of the yoke. The locking lever may define lever teeth. A bias member may be disposed between the base of the yoke and the teeth of the head. A first detent ball may be disposed between a first end of the bias member and the tang teeth, and a second detent ball may be disposed between the bias member and the handle. The second detent ball may selectively engage one of the first and second detents of the handle. The locking lever may be configured to selectively engage the tang teeth with the lever teeth to retain the angle between the head and the handle.

According to another embodiment, a flex joint ratchet tool may include a head having a joint tang defining tang teeth and handle defining a yoke and a yoke base. The head may be pivotally coupled to the yoke and the yoke base may define first and second detents. A locking lever may be rotatably coupled to the handle and configured to rotate between first and second positions. The locking lever may include a base defining lever teeth. The locking lever may define a through hole. The locking lever may be configured to selectively engage the tang teeth with the lever teeth to retain a selected angle between the head and the handle. A detent mechanism may include a bias member disposed in the through hole, a first detent ball disposed between a first end of the bias member and the tang teeth, and a second detent ball disposed between the bias member and the handle. The second detent ball may selectively engage one of the first and second detents. Actuation of the locking lever may provide a tactile indication when the locking lever enters the first or second position.

BRIEF DESCRIPTION OF THE DRAWINGS

For purposes of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
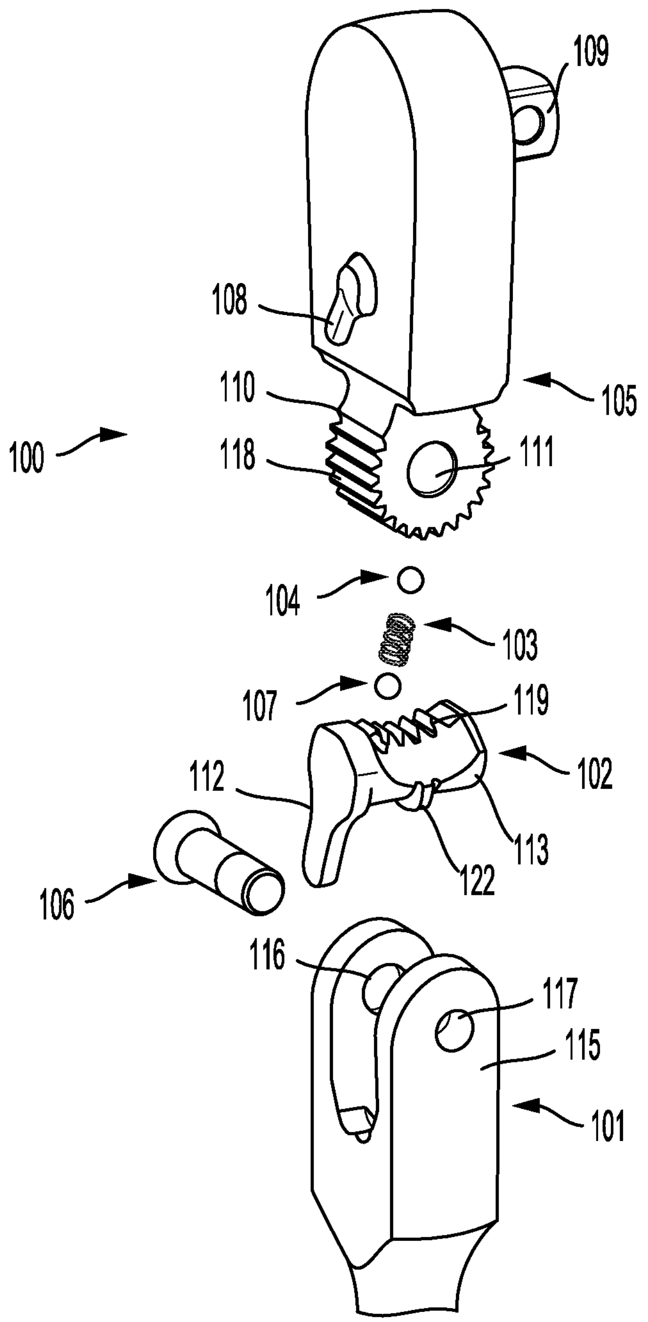
FIG. 1 is an exploded perspective view of an exemplar tool, such as a ratchet-type wrench tool, incorporating an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention but is instead used to discuss exemplary embodiments of the invention for explanatory purposes only.

The present invention relates broadly to a tool having a flex-joint type head, such as, for example, a ratchet or breaker bar. The flex-joint type head includes a locking mechanism adapted to selectively retain an angle of the head relative to a handle of the tool. According to an embodiment, the locking mechanism may rotate between at least one of two positions, and may include a bias member and two detent balls disposed at opposing ends of the bias member. The bias member and detent balls may be disposed in a through hole defined in a locking lever, with one detent ball engaging teeth of a joint tang, and the other detent ball engaging one of at least two detents formed or defined in a tool body or handle. The locking lever may rotate between first and second positions, whereby when disposed in the first position, the tool head is prevented from rotating relative to the handle (i.e., the desired angle between the tool head and the handle is locked), and when disposed in the second position, the tool head may selectively rotate relative to the handle.

Figure 2D:
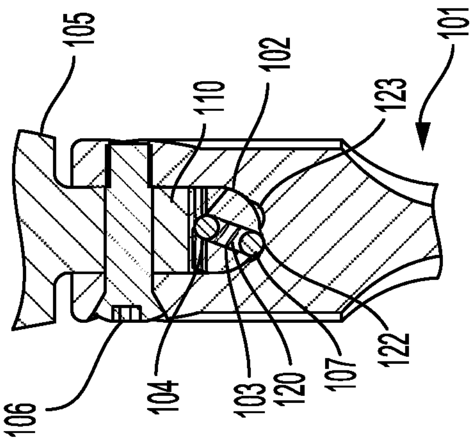
FIG. 2D is partial sectional view of the tool head of FIG. 2C, taken along line B-B in FIG. 2C, according to an embodiment of the invention.
Figure 2C:
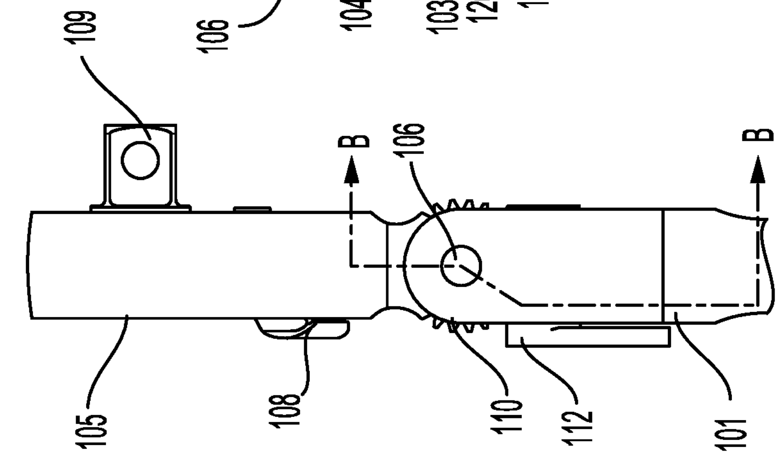
FIG. 2C is partial side view of the tool head of FIG. 2A, with the locking mechanism disposed in the first position, according to an embodiment of the invention.
Figure 2B:
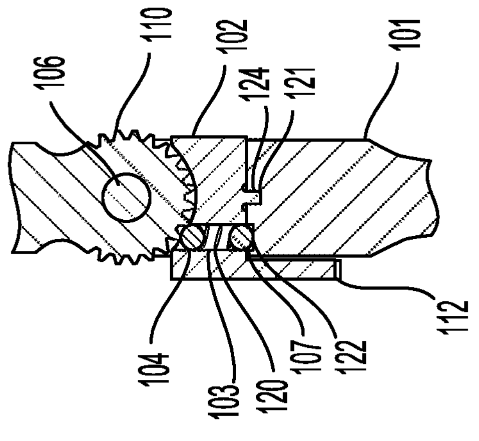
FIG. 2B is partial sectional view of the tool head of FIG. 2A, taken along line A-A in FIG. 2A, according to an embodiment of the invention.
Figure 2A:
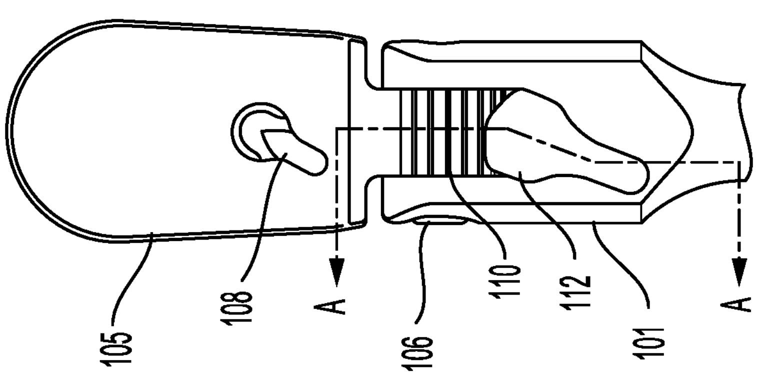
FIG. 2A is partial rear view of the tool head of FIG. 1, with the locking mechanism disposed in the first position, according to an embodiment of the invention.
Figures 3A, 3B, 3C, 3D:
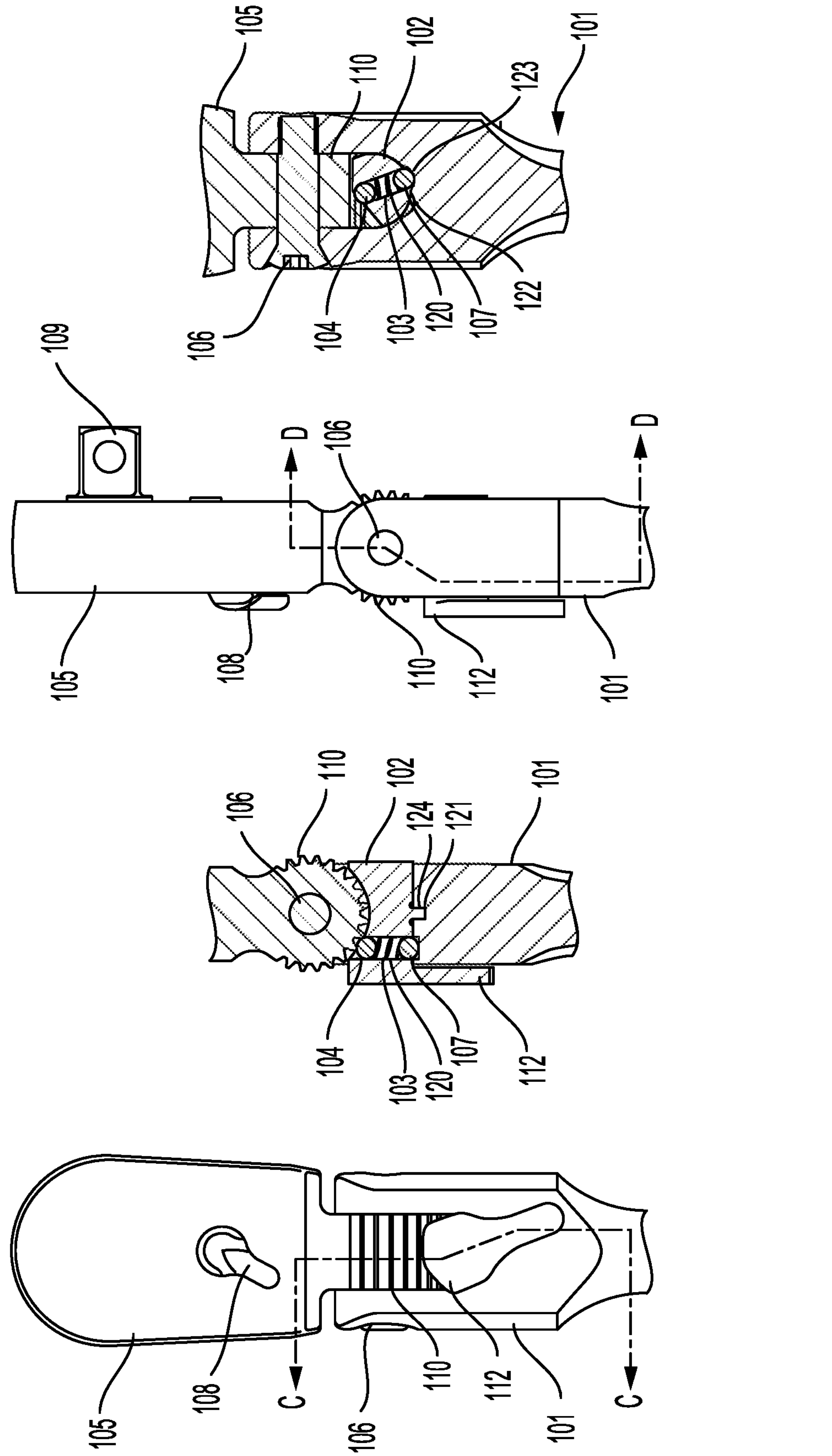
FIG. 3A is partial rear view of the tool head of FIG. 1, with the locking mechanism disposed in the second position, according to an embodiment of the invention.
FIG. 3B is partial sectional view of the tool head of FIG. 3A, taken along line C-C of FIG. 3A, according to an embodiment of the invention.
FIG. 3C is partial side view of the tool head of FIG. 3A, with the locking mechanism disposed in the second position, according to an embodiment of the invention.
FIG. 3D is partial sectional view of the tool head of FIG. 3C, taken along line D-D of FIG. 3C, according to an embodiment of the invention.

Referring to FIGS. 1-3D, a tool 100, such as, for example, a ratchet wrench or a breaker bar, includes a tool head 105 pivotably coupled to a handle 101 about a pin 106. The pin 106 may extend along a pin axis substantially perpendicular to a longitudinal axial direction of the tool 100. The head 105 may include a driver 109, such as, for example, a lug, that is adapted to be coupled to a socket or other device to operate on a workpiece in a well-known manner. A directional lever 108 may operate a ratchet gear (not shown) to determine a rotational direction of the driver 109, as is known in the art. As shown, the head 105 may include a joint tang 110 having tang teeth disposed or formed at an end of the head 105. The tang 110 may define a pin hole 111 for pivotally receiving the pin 106.

The head 105 may be further coupled to the handle 101 about a locking lever 102. The handle 101 may include or form a yoke 115 adapted to receive, e.g., sandwich, the locking lever 102 and at least a portion of the head 105, such as the tang 110. The yoke 115 may further include or define pin holes 116, 117 for receiving the pin 106 and further pivotally coupling the head 105 to the handle 101. The locking lever 102 includes a base 113 that acts as a structural support of the locking lever 102, and a protrusion 112 that a user can use to rotate the locking lever 102 to cause selective engagement of the locking lever 102 against the head 105, and therefore to retain the selected angle of the head 105 relative to the handle 101.

The tang teeth 118 of the joint tang 110 are adapted to meshingly engage corresponding lever teeth 119 of the locking lever 102 to control pivotal movement of the handle 101 relative to the head 105. In an embodiment, the lever teeth 119 may be grooves that extend along a partial edge of the locking lever 102. The locking lever 102 may include or form a ridge 124 adapted to engage a corresponding groove 121 formed in the handle 101.

The locking lever 102 may include or define a through hole 120 configured to receive a bias member 103, such as a spring, and portions of a first detent ball 104 and second detent ball 107. According to an embodiment, the through hole 120 may be formed off-center relative to the locking lever 102 (i.e., offset from a tool longitudinal axis defined by the handle 101). The first detent ball 104 may engage the tang teeth 118 of the joint tang 110. The second detent ball 107 may engage one of either of a first detent 122 or a second detent 123 formed or defined in the handle 101, depending on the rotational disposition of the locking lever 102. The off-center through hole 120 may limit the depth required for the first and second detents 122, 123, while still allowing the second detent ball 107 to engage with the tang teeth 118 of the joint tang 110.

In an embodiment, a user can selectively rotate the locking lever 102 by using the protrusion 112 to engage the lever teeth 119 with the tang teeth 118 of the joint tang 110 in the locked position. As shown in FIGS. 2A-D, the locking lever 102 is adapted to rotate such that the lever teeth 119 meshingly engage the tang teeth 118 when the tool head 100 is in the locked position. As shown in FIGS. 3A-D, when the locking lever 102 is rotated using protrusion 112 to an unlocked position, the lever teeth 119 rotate out of engagement with the tang teeth 118, allowing the tool head 105 to rotate freely. The locking lever base 113 can have a substantially arcuate section with a variable diameter. A diameter formed by the lever teeth 119 of the locking lever 102 (i.e., at all or part of the portions with lever teeth 119) can be larger than a diameter of the arcuate section of the base 113. The lever teeth 119 can therefore engage the tang teeth 118 of the joint tang 110 in the locked position when the user rotates the protrusion 112 to thereby cause the lever teeth 119 to engage the tang teeth 118. The smaller diameter of the non-toothed portion of the base 113 provides a clearance between the tang 110 and the locking lever 102, thereby allowing substantially free rotation of the tool head 105 about the pin 106 to allow a user to select an angle between the tool head 105 and handle 101.

In an embodiment, the engagement tolerances between the lever teeth 119 and tang teeth 118 is minimal, thus minimizing play or undesired movement between the handle 101 and head 105, creating an interference-like fit. The user can then rotate the protrusion 112 into the unlocked position, where the locking lever teeth 119 can be spaced from or otherwise disengaged from the tang teeth 118, to release the engagement of the teeth and allow the movement of the head with respect to the handle. In this manner, the locking lever 102 can allow quick and easy retention of the handle 101 about the locking lever 102 and, by extension, the tool head 105.

In an embodiment, the tool 100 may include a dual ball detent mechanism to provide a tactile indication when rotating the handle 101 about the head 105. For example, and as shown, a positive detent can be provided by a dual ball detent mechanism that includes the first detent ball 104, bias member 103, and a second detent ball 107 located within the through hole 120 of the locking lever 102. The bias member 103 can act on the first and second detent balls 104, 107 to engage the locking lever teeth 119 upon rotation of the handle 102. The first detent ball 104 may ride along the peaks and valleys of the tang teeth 118 to provide a tactile indication and to therefore inform the user with a tactile response when the handle 101 has been rotated by one tang tooth 119.

The handle 101 further includes or defines a first detent 122 and a second detent 123 for engaging the second detent ball 107 when the locking lever 102 is in the locked or unlocked positions. For example, as shown in FIGS. 2A-D, which depict the locking lever in the locked position, the second detent ball 107 is engages the first detent 122 of the handle 101. On the other hand, when the locking lever is disposed in the unlocked position, as shown in FIGS. 3A-D, the second detent ball 107 engages the second detent 123. The dual detent ball mechanism provides a user with a tactile response to both angular rotation of the head 105 relative to the handle 101, via first detent ball 104 and tang teeth 119 interaction, as well as a tactile response for when the locking lever 102 is disposed in either of the locked or unlocked positions, via the second detent ball 107 and first and second detents 122, 123 interaction.

While embodiments of the present invention are depicted with a tool head defining or including a joint tang and a handle defining or including a yoke, one skilled in the art will understand that the configuration may be revered without deviating from the scope of the present invention. For example, the handle may define or include a joint tang with teeth while the tool head defines or includes a yoke for receiving the joint tang of the handle. The locking lever and dual detent ball mechanism may be configured and operate substantially the same.

As used herein, the term "coupled" and its functional equivalents are not intended to necessarily be limited to direct, mechanical coupling of two or more components. Instead, the term "coupled," and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

As used herein terms denoting direction, order, or orientation such as "first," "second," "horizontal," "vertical," "lateral," "top," "bottom," "left," "right," "over," "under," "above," "below," "front," back," or the like, are non-limiting and used herein for ease of explanation. One of skill in the art will recognize the use of these terms as merely descriptive examples that do not limit the placement, orientation, or disposition of the elements described using such terms.

The matter set forth in the foregoing description and accompanying drawings is offered by way of illustration only and not as a limitation. While embodiments have been shown and described, it will be apparent to those skilled in the art that changes or modifications may be made without departing from the broader aspects of the inventors' contribution. The actual scope of the protection sought is intended to be defined in the following claims when viewed in their proper perspective based on the prior art.

What is claimed is:

1. A tool having a head pivotally coupled to a handle, the tool comprising:

a joint tang defining tang teeth and disposed on the head, first and second detents disposed on the handle;

a locking lever rotatably coupled to the handle and adapted to be selectively disposed in one of either locked and unlocked positions, the locking lever including a base having lever teeth, wherein when the locking lever is disposed in the locked position, the tang teeth engage the lever teeth to selectively retain an angle between the head and the handle, and when the locking lever is disposed in the unlocked position, the tang teeth disengage the lever teeth to allow the angle between the head and the handle to be adjusted;

a through hole disposed in the locking lever;

a bias member having opposing first and second ends and being disposed in the through hole;

a first detent ball disposed between the first end of the bias member and the tang teeth, wherein the first detent ball is adapted to engage the tang teeth; and a second detent ball disposed between the second end of the bias member and the handle, wherein the second detent ball is adapted to engage the first detent when the locking lever is disposed in the locked position, and the second detent ball is adapted to engage the second detent when the locking lever is disposed in the unlocked position.

2. The tool of claim 1, further comprising a pin pivotably coupling the joint tang of the head to the handle, wherein the pin extends along a pin axis that is substantially perpendicular to a longitudinal axial direction of the tool.

3. The tool of claim 1, wherein the handle includes a yoke and wherein the locking lever and joint tang are coupled to the handle within the yoke.

4. The tool of claim 1, wherein the handle includes a groove adapted to receive a corresponding ridge on the locking lever.

5. The tool of claim 1, wherein the head includes a driver.

6. The tool of claim 5, wherein the driver includes a lug.

7. The tool of claim 5, wherein the driver includes a ratchet mechanism.

8. The tool of claim 1, wherein the through hole is disposed off-center relative to a tool axis defined by the handle.

9. A ratchet tool including a head and a handle, the ratchet tool comprising:

tang teeth disposed on the head;

a yoke with a yoke base disposed on the handle, wherein the yoke base includes first and second detents, and the head is pivotally coupled to and disposed within the yoke;

a locking lever disposed in the yoke between the head and a base of the yoke, the locking lever including lever teeth and adapted to selectively rotate between locked and unlocked positions, wherein when the locking lever is disposed in the locked position, the tang teeth engage the lever teeth to retain an angle between the head and the handle, and when the locking lever is disposed in the unlocked position, the tang teeth disengage the lever teeth allowing the angle between the head and the handle to be adjusted;

a bias member having opposing first and second ends and disposed between the base of the yoke and the tang teeth;

a first detent ball disposed between the first end of the bias member and the tang teeth, wherein the first detent ball is adapted to engage the tang teeth; and a second detent ball disposed between the bias member and the handle, wherein the second detent ball engages the first detent when the locking lever is disposed in the locked position, and the second detent ball engages the second detent when the locking lever is disposed in the unlocked position.

10. The ratchet of claim 9, wherein the locking lever includes a through hole and the bias member is disposed in the through hole.

11. The ratchet of claim 10, wherein the first and second detent balls are at least partially disposed in the through hole.

12. The ratchet of claim 9, wherein the yoke base includes a groove adapted to receive a corresponding ridge of the locking lever.

13. The ratchet of claim 9, further comprising a pin pivotably coupling the head to the yoke, wherein the pin extends along a pin axis that is substantially perpendicular to an axial direction of the tool.

14. A flex-type joint tool comprising:

a head having a joint tang including tang teeth;

a handle including a yoke and a yoke base, wherein the head is pivotally coupled to the yoke and the yoke base and includes first and second detents;

a locking lever rotatably coupled to the handle and adapted to selectively rotate between locked and unlocked positions, the locking lever includes a base having lever teeth, wherein when the locking lever is disposed in the locked position, the tang teeth engage the lever teeth to retain an angle between the head and the handle, and when the locking delver is disposed in the unlocked position, the tang teeth disengages the lever teeth to allow the angle between the head and the handle to be adjusted;

a through hole disposed in the locking lever; and a detent mechanism including:

a bias member having opposing first and second ends and being disposed in the through hole;

a first detent ball disposed between the first end and the tang teeth, wherein the first detent ball is adapted to engage the tang teeth; and a second detent ball disposed on the second end and the handle, wherein when the locking lever is disposed in the locked position, the second detent ball engages the first detent, and when the locking lever is disposed in the unlocked position, the second detent ball engages the second detent.

* * * * *